(12) United States Patent
Kawada (10) Patent No.: US 8,817,169 B2
(45) Date of Patent: Aug. 26, 2014

(54) MOTOR DRIVEN OPTICAL APPARATUS

(75) Inventor: Kazutoshi Kawada, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 544 days.

(21) Appl. No.: 13/078,495

(22) Filed: Apr. 1, 2011

(65) Prior Publication Data

US 2011/0242678 A1     Oct. 6, 2011

(30) Foreign Application Priority Data

Apr. 5, 2010   (JP) ................................. 2010-086810

(51) Int. Cl.
| H04N 5/232 | (2006.01) |
| H04N 5/225 | (2006.01) |
| G02B 15/14 | (2006.01) |

(52) U.S. Cl.
USPC ............................ 348/352; 348/335; 359/696

(58) Field of Classification Search
USPC ............................ 359/696; 348/335, 360, 361
See application file for complete search history.

(56) References Cited

U.S. PATENT DOCUMENTS

| 6,348,948 | B1* | 2/2002 | Kyuma .......................... 348/360 |
| 6,633,729 | B1* | 10/2003 | Yoshikawa et al. .............. 396/76 |
| 7,151,570 | B2* | 12/2006 | Kaneda .......................... 348/360 |
| 2002/0109784 | A1* | 8/2002 | Suda et al. ..................... 348/345 |
| 2003/0030741 | A1* | 2/2003 | Ohta .............................. 348/345 |
| 2005/0094023 | A1* | 5/2005 | Natsume et al. .............. 348/345 |
| 2008/0247741 | A1* | 10/2008 | Yasuda .......................... 396/104 |
| 2009/0040359 | A1* | 2/2009 | Tanaka .......................... 348/335 |
| 2013/0093937 | A1* | 4/2013 | Kawai ........................... 348/345 |

FOREIGN PATENT DOCUMENTS

| JP | 2918183 B2 | 7/1999 |
| JP | 2009-162881 A | 7/2009 |

OTHER PUBLICATIONS

Japanese Office Action cited in Japanese counterpart application No. JP2010-086810, dated Mar. 4, 2014.

\* cited by examiner

Primary Examiner — Nhan T Tran
Assistant Examiner — Chan Nguyen
(74) Attorney, Agent, or Firm — Rossi, Kimms & McDowell LLP (57) ABSTRACT

The optical apparatus including a motor to move an optical element, a position detector configured to detect a position of the optical element, a controller configured to control drive of the motor by using a position detection signal from the position detector, and a memory configured to store a reference movement amount of the optical element corresponding to a moving speed and a moving time period of the optical element moved by the motor. The controller is configured to acquire a correction value for reducing a difference between (a) an actual movement amount of the optical element obtained by using the position detection signal when the optical element is moved by the motor and (b) the reference movement amount, and then to control the drive of the motor by using the correction value.

11 Claims, 8 Drawing Sheets

MOTOR DRIVEN OPTICAL APPARATUS

BACKGROUND OF THE INVENTION

1. Field of the Invention

The present invention relates to an optical apparatus such as an image pickup apparatus and an interchangeable lens, and particularly to an optical apparatus in which an optical element such as a lens is moved by a motor.

2. Description of the Related Art

In such an optical apparatus, when the motor moves the optical element, rotation unevenness (vibration) of the motor caused due to manufacturing errors thereof generates noise to increase motor drive sound.

Japanese Patent No. 2918183 discloses a method for reducing vibration of a stepping motor caused due to manufacturing errors thereof. Specifically, the method stores in a memory, for each of error ranks predetermined based on amount of an electric angle error between excitation phases of the stepping motor, an electric angle correction value corresponding to the electric angle error amount. Then, the method reads from the memory the electric angle correction value corresponding to the error rank of each stepping motor, and changes switching timings of the excitation phases of that stepping motor by the electric angle correction value to correct a phase of an excitation current applied to each excitation phase, thereby reducing the vibration of the stepping motor.

However, the vibration reduction method disclosed in Japanese Patent No. 2918183 needs to predetermine the error ranks of the individual stepping motors based on the electric angle error amount between the excitation phases. Methods to obtain the electric angle error amount include measuring arrangement dimensions of stator pole teeth by using a precision scale or by measuring a vibration amount of an actually driven motor to evaluate (calculate) the electric angle error amount based thereon, any of which needs measurement or calculation for each motor.

In addition, since the vibration reduction method disclosed in Japanese Patent No. 2918183 predetermines the error rank of each motor, even when characteristics of the motor change with time, the change is not corrected. Therefore, the vibration reduction method cannot always use a proper correction value.

SUMMARY OF THE INVENTION

The present invention provides an optical apparatus capable of reducing motor drive sound when a motor moves an optical element without need of a complex preceding process such as error ranking based on an electric angle error amount.

The present invention provides as an aspect thereof an optical apparatus including a motor to move an optical element, a position detector configured to detect a position of the optical element, a controller configured to control drive of the motor by using a position detection signal from the position detector, and a memory configured to store a reference movement amount of the optical element corresponding to a moving speed and a moving time period of the optical element moved by the motor. The controller is configured to acquire a correction value for reducing a difference between (a) an actual movement amount of the optical element obtained by using the position detection signal when the optical element is moved by the motor and (b) the reference movement amount, and then to control the drive of the motor by using the correction value.

The present invention provides as another aspect thereof an optical apparatus including a motor to move an optical element, a position detector configured to detect a position of the optical element, and a controller configured to control drive of the motor by using a position detection signal from the position detector. The controller is configured to (a) detect plural times, in a state of causing the motor to move the optical element at a constant speed, a movement amount of the optical element within a predetermined time by using the position detection signal, (b) acquire a correction value for reducing a variation amount of the detected movement amounts, and (c) control the drive of the motor by using the correction value.

The present invention provides as still another aspect thereof an optical apparatus including a motor to move an optical element, a position detector configured to detect a position of the optical element, a controller configured to control drive of the motor by using a position detection signal from the position detector, and a memory configured to store a reference movement amount of the optical element corresponding to a moving speed and a moving time period of the optical element moved by the motor. The controller is configured to control the drive of the motor so as to reduce a difference between (a) an actual movement amount of the optical element obtained by using the position detection signal when the optical element is moved by the motor and (b) the reference movement amount.

The present invention provides as yet still another aspect thereof an optical apparatus including a motor to move an optical element, a position detector configured to detect a position of the optical element, and a controller configured to control drive of the motor by using a position detection signal from the position detector. The controller is configured to (a) detect plural times, in a state of causing the motor to move the optical element at a constant speed, a movement amount of the optical element within a predetermined time by using the position detection signal, and (b) control the drive of the motor so as to reduce a variation amount of the detected movement amounts.

Further features of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Embodiment 1

Figure 1:
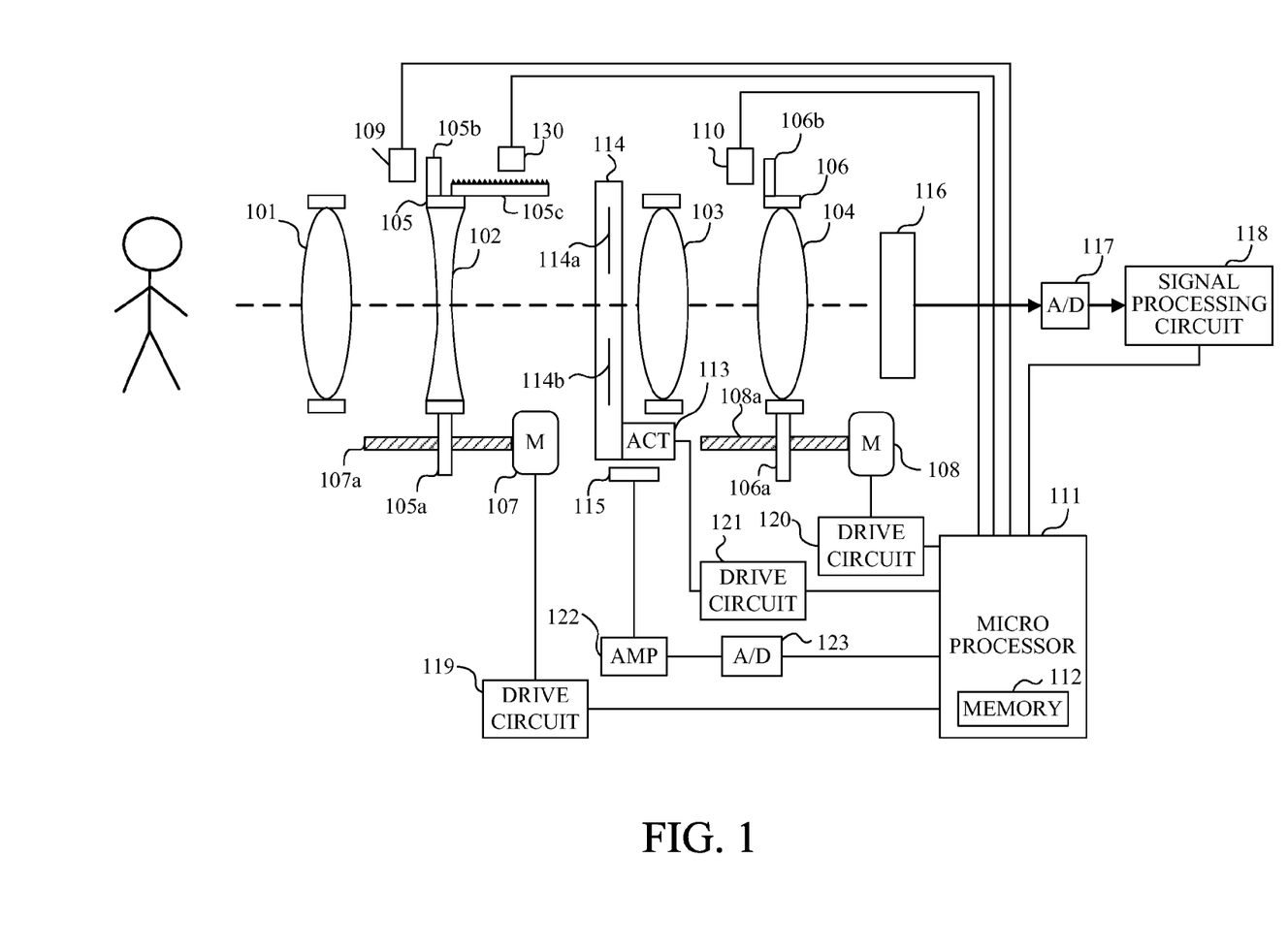
FIG. 1 is a block diagram showing a configuration of an image pickup apparatus that is Embodiment 1 of the present invention.

FIG. 1 shows a configuration of an image pickup apparatus (optical apparatus) that is a first embodiment (Embodiment 1) of the present invention such as a digital still camera and a video camera. Although this embodiment will describe the image pickup apparatus, alternative embodiments of the present invention include optical apparatuses other than the image pickup apparatus such as an interchangeable lens.

<Configuration of Image Pickup Apparatus>

The image pickup apparatus of this embodiment is provided with an image taking optical system that includes, in order from an object side, a field lens 101, a variable magnification lens (or a magnification-varying lens) 102, a variable aperture unit (light amount adjusting unit) 114, an afocal lens 103 and a focus lens 104. The image taking optical system is a rear focus type zoom lens. Reference numeral 116 denotes an image pickup element such as a CCD sensor or a CMOS sensor that photoelectrically converts an object image formed by the image taking optical system.

The variable magnification lens 102 and the focus lens 104 are respectively held by lens holding frames 105 and 106. These lens holding frames 105 and 106 are guided by guide bars (not shown) so as to be movable in an optical axis direction (direction in which a dotted line extends in the figure). The lens holding frames 105 and 106 are respectively provided with racks 105a and 106a attached thereto. The racks 105a and 106a respectively engage with screw shafts 107a and 108a that are output shafts of stepping motors 107 and 108. Rotation of each screw shaft driven by each stepping motor moves each lens holding member to which each rack is attached in the optical axis direction by engagement of the screw shaft and the rack.

Before moving the lens holding frames 105 and 106 (that is, the variable magnification lens 102 and the focus lens 104) to respective target positions by drive of the stepping motors 107 and 108, the image pickup apparatus moves the lenses 102 and 104 to respective reference positions in lens position control at a time of activation of the image pickup apparatus.

The image pickup apparatus is provided with reference position sensors to respectively detect whether or not the variable magnification lens 102 and the focus lens 104 are located at their reference positions. The reference position sensors are constituted by photo interrupters 109 and 110 each including a light-emitting element and a light-receiving element integrally formed with each other. Insertion of light-shielding portions 105b and 106b respectively provided on the lens holding frames 105 and 106 into spaces between the light-emitting element and the light-receiving element of the photo interrupters 109 and 110 blocks light projected from the light-emitting element toward the light-receiving element. Thereby, detection that the lenses 102 and 104 are located at their reference positions is made.

Then, the image pick up apparatus inputs to each stepping motor a driving signal having a number of pulses necessary to move each lens from the reference position to the target position. The light-shielding portion 105b is formed to have a shape enabling telephoto side zoon detection and wide-angle side zoon detection of the variable magnification lens 102. On the other hand, the light-shielding portion 106b is formed to have a shape enabling infinite far side zoon detection and close side zoon detection of the focus lens 104.

The lens holding frame 105 is provided with a position scale 105c fixed thereto for detecting the position of the variable magnification lens (optical element) 102. Moreover, a lens barrel part (not shown) is provided with a lens position sensor 130 fixed thereto at a position facing the position scale 105c. The lens position sensor 130 and the position scale 105c constitute a position detector.

The position scale 105c has a scale pattern such as a magnetic pattern or a light reflective pattern which changes in the optical axis direction. Movement of the position scale 105c with the variable magnification lens 102 with respect to the lens position sensor 130 in the optical axis direction changes an intensity of magnetism or reflected light according to the scale pattern, and the lens position sensor 130 converts the magnetism or reflected light whose intensity changes, into an electrical signal to output it as a position detection signal. The position detection signal output from the lens position sensor 130 is input to a microprocessor 111 described later to be used for position control of the variable magnification lens 102 through control of drive of the stepping motor 107.

Figure 6:
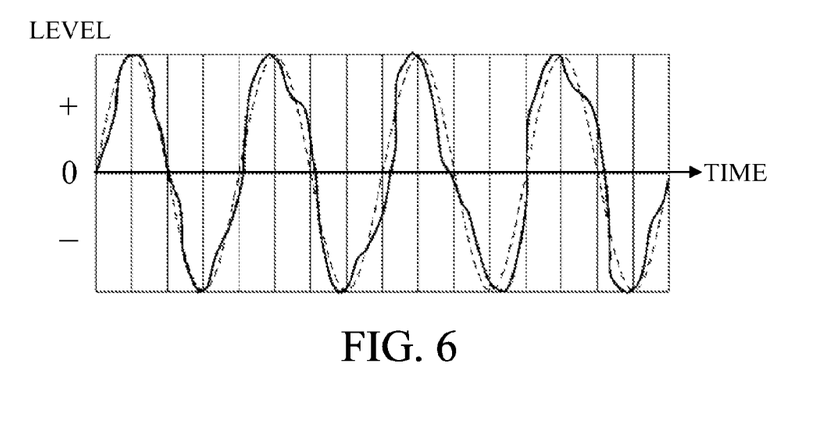
FIG. 6 shows output waveforms of a lens position sensor used in the image pickup apparatus of Embodiment 1.

FIG. 6 shows output waveforms (temporal output level changes) of the lens position sensor 130. A broken line shows the output waveform of the lens position sensor 130 when the stepping motor 107 is a motor whose level of vibration caused due to manufacturing errors is small. A solid line shows the output waveform of the lens position sensor 130 when the stepping motor 107 is a motor whose level of vibration caused due to manufacturing errors is large. Each output waveform is basically a trigonometric waveform, and the position of the variable magnification lens 102 can be calculated as a value corresponding to an angle of a sine function or a cosine function.

These two output waveforms clearly have a difference, and a vibration amount of the stepping motor 107 appears as a distortion amount of the output waveform. Since the distortion amount can be detected as variation of the movement amount of the variable magnification lens 102 per unit time, a state where the vibration amount of the stepping motor 107 becomes smallest can be obtained from a variation amount of the movement amount of the variable magnification lens 102.

This embodiment provides the lens position sensor 130 for the variable magnification lens 102. This is because, in the rear focus type zoom lens, the variable magnification lens 102 is larger and heavier than the focus lens 104 and therefore a large motor torque is needed for driving the variable magnification lens 102, and the variable magnification lens 102 is moved widely and therefore a high-speed drive thereof is necessary. However, the lens position sensor may be provided for the focus lens 104.

Moreover, although this embodiment describes the case where the variable magnification lens 102 and the focus lens 104 are moved by the stepping motors, these lenses 102 and 104 may be moved by other motors such as voice coil motors (VCMs).

The microprocessor 111 as a controller governs control of the entire operation of the image pickup apparatus in response to inputs from operation members (not shown) such as a power switch, a recording switch and a zoom switch. An internal memory 112 provided inside the microprocessor 111 stores position data of a telephoto end and a wide-angle end of the variable magnification lens 102 with respect to the reference position thereof as data that can be compared with actual positions obtained by the position detection signal from the lens position sensor 130. Moreover, the internal memory 112 stores position data of the focus lens 104, each being decided according to an object distance and the position of the variable magnification lens 102, as a number of steps corresponding to a rotation amount of the stepping motor 108.

The stepping motors 107 and 108 are respectively driven by stepping motor drive circuits 119 and 120 that receive drive control signals from the microprocessor 111. Each of the stepping motor drive circuits 119 and 120 respectively supplies excitation signals (excitation currents or excitation voltages) to an A-phase coil and a B-phase coil of each of the stepping motors 107 and 108 according to the drive control signal.

The microprocessor 111 controls the drive of the stepping motors 107 and 108 by a so-called electronic cam method using cam track data stored in the internal memory 112 to perform a magnification variation operation of the image taking optical system and a correction operation for correcting image plane variation caused thereby.

In this embodiment, there is no limitation on a driving method for each stepping motor, that is, each stepping motor may be driven by any driving method such as a micro-step drive method, a 1-2 phase excitation drive method and a 2-2 phase excitation drive method.

The variable aperture unit 114 includes a variable aperture motor 113 constituted by a so-called galvano motor, variable aperture blades 114a and 114b being driven in open and close directions by the variable aperture motor 113 and a position detection element (hall element) 115 to detect an open/close state of the variable aperture blades 114a and 114b.

In the image pickup apparatus thus configured, an analog electric signal from the image pickup element 116 photoelectrically converting the object image is converted into a digital signal by an A/D conversion circuit 117, and the digital signal is input to a signal processing circuit 118. The signal processing circuit 118 performs various image processing on the input digital signal to generate captured image data and luminance information of the captured image data. The captured image data is recorded to a recording medium (not shown) in a recording part 150.

The microprocessor 111 performs feedback control of the variable aperture motor 113 such that the luminance information obtained from the signal processing circuit 118 shows a proper luminance. In this feedback control, an analog signal output from the position detection element 115 and showing the open/close state of the variable aperture unit 114 is amplified by an amplifier 122, and then the amplified analog signal is converted into a digital signal by the A/D conversion circuit 123. The digital signal is input to the microprocessor 111 as variable aperture position information. The microprocessor 111 sends, on the basis of the variable aperture position information, an open/close control signal to a variable aperture drive circuit 121 to control the variable aperture motor 113 therethrough such that the luminance information shows a proper luminance.

Figure 2:
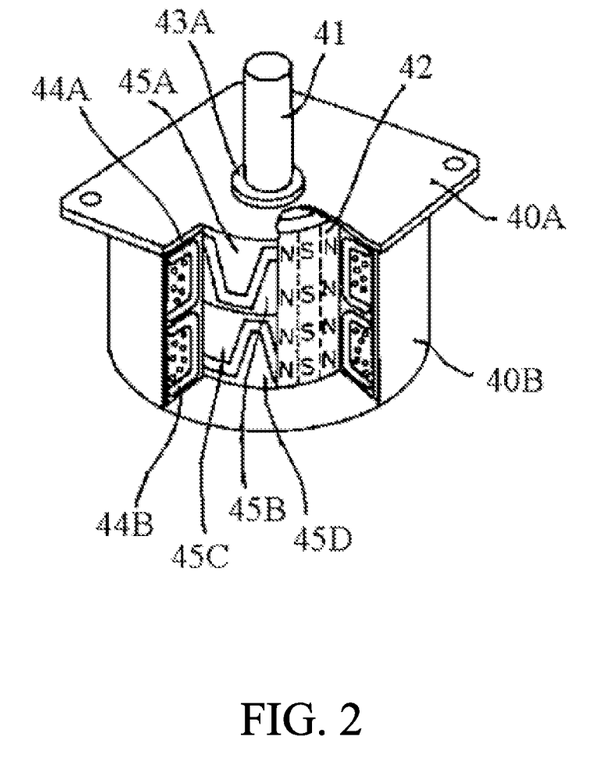
FIG. 2 is an exploded view of a stepping motor used in the image pickup apparatus of Embodiment 1.

Next, description will be made of a configuration of a PM type two-phase stepping motor being used as the stepping motor 107 for driving the variable magnification lens 102 in this embodiment with reference to FIG. 2 (and FIGS. 3A to 3D). FIG. 2 is a partially cutaway view of the PM type two-phase stepping motor showing an inside configuration thereof.

In FIG. 2, reference numeral 41 denotes an output shaft of the stepping motor, and reference numeral 42 denotes a magnet rotor integrally attached to the output shaft 41. The output shaft 41 is rotatably supported by a bearing 43A provided on a case plate 40A and a bearing (not shown) provided on a cylindrical case 40B.

Inside the cylindrical case 40B, bobbins 44A and 44B around which coils are wound are housed. Inside the bobbins 44A and 44B, stators 45A, 45B, 45C and 45D each being formed to have comb teeth are arranged.

In the stepping motor in this embodiment, one step corresponds to a rotation angle of 9 degrees, and therefore the rotor 42 has ten pairs of N and S poles that are magnetized poles. Moreover, the stators 45A, 45B, 45C and 45D are arranged to mutually have a circumferential angle difference of 9 degrees and are mutually axially overlapped.

The coil wound on each of the bobbins 44A and 44B passes an excitation current therethrough for producing magnetic poles on the comb teeth of each stator. The coil wound on the bobbin 44A is referred to as an "A-phase coil", which excites the stators 45A and 45B. The coil wound on the bobbin 44B is referred to as a "B-phase coil", which excites the stators 45C and 45D.

Next, description will be made of a principle of rotation of the stepping motor with reference to FIGS. 3A to 3D. FIGS. 3A to 3D show positional relationships of the magnetic poles of the stator and the rotor in 2 phase excitation drive.

Figure 3A:
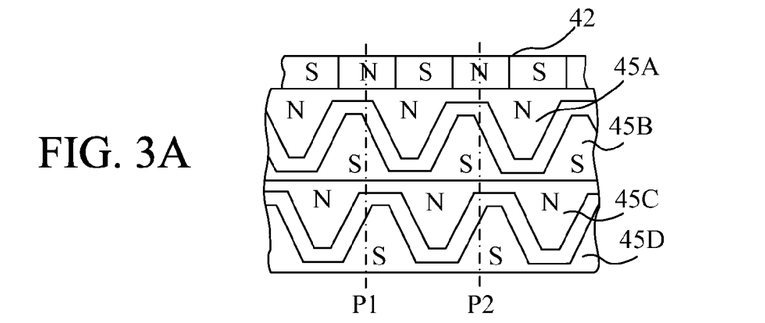
FIGS. 3A to 3D show positional relationships between a stator and a rotor of the stepping motor.

FIG. 3A shows a state where excitation currents are flowed in the A-phase coil and the B-phase coil in a forward direction. In this state, the stator 45A, 45B, 45C and 45D are respectively magnetized to be N, S, N and S poles. Focusing on positions of the S poles of the stators in this state, centers of the S poles are located at positions shown by P1 and P2 corresponding to central positions between the comb teeth of the stators 45B and 45D, and the N pole of the rotor 42 is stably located at a position facing the stator's S pole centers P1 and P2.

Figure 3B:
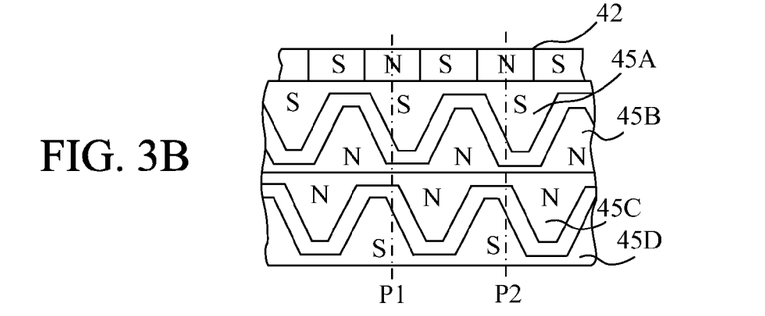

FIG. 3B shows a state where the excitation current is flowed in the A-phase coil in a reverse direction to that shown in FIG. 3A while the excitation current is flowed in the B-phase coil in the same direction as that shown in FIG. 3A. In this state, the stators 45A and 45B are respectively changed to S and N poles, and thereby the stator's S pole centers P1 and P2 are rotated by 9 degrees, and therewith the N pole of the rotor is also rotated by 9 degrees.

Figure 3C:
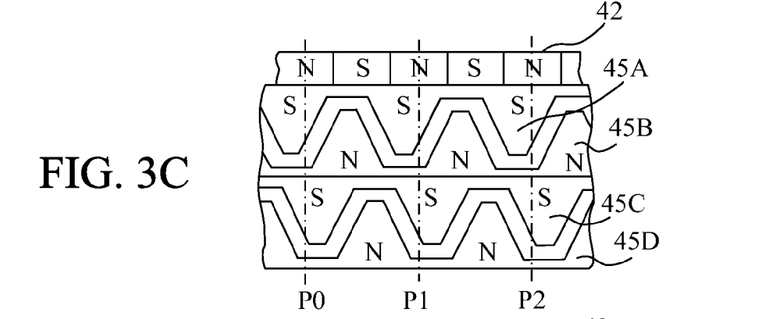
Figure 3D:
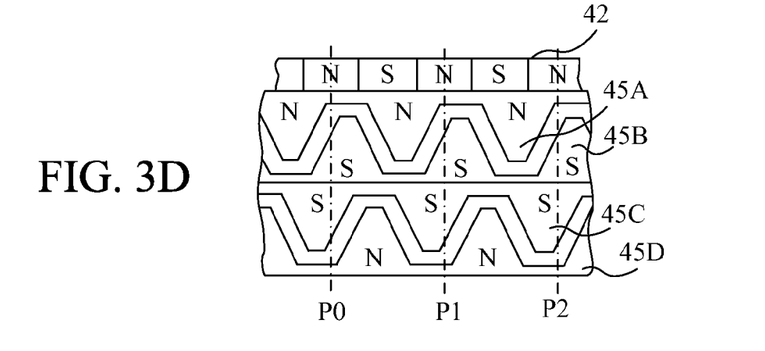

Similarly, switching directions in which the excitation currents are flowed in the A- and B-phase coils as shown in FIGS. 3C and 3D rotates the stator's S pole centers by 9 degrees at one switching, and thereby the rotor 42 is rotated by 9 degrees at one step.

<Operation of Image Pickup Apparatus>

Figure 4:
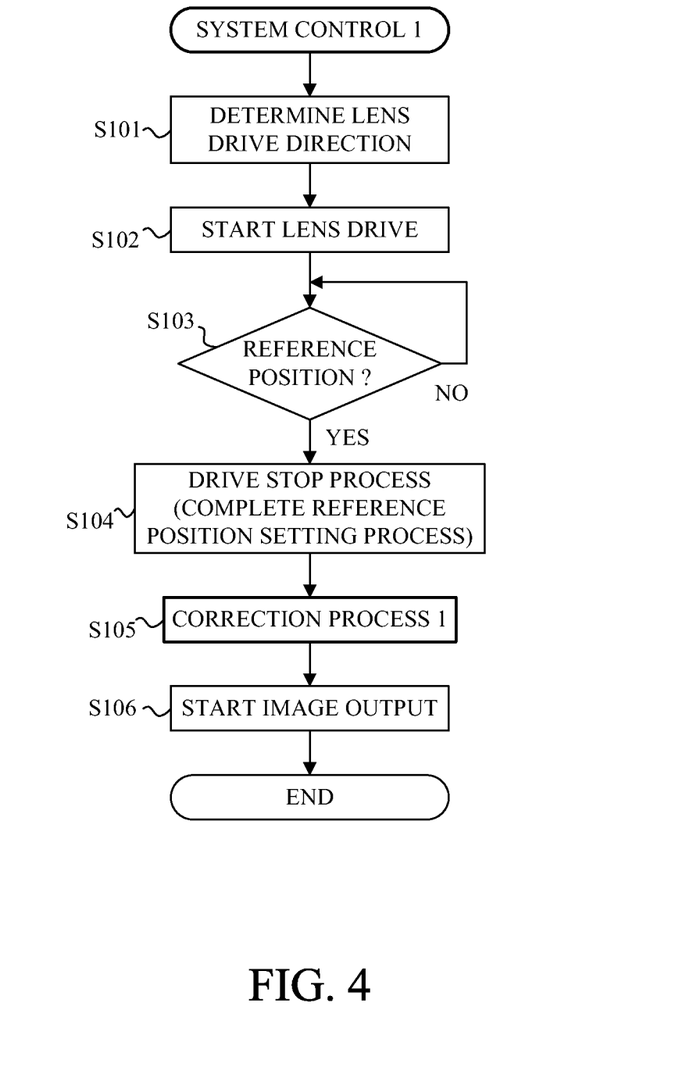
FIG. 4 is a flowchart showing operations of the image pickup apparatus of Embodiment 1.
Figure 5:
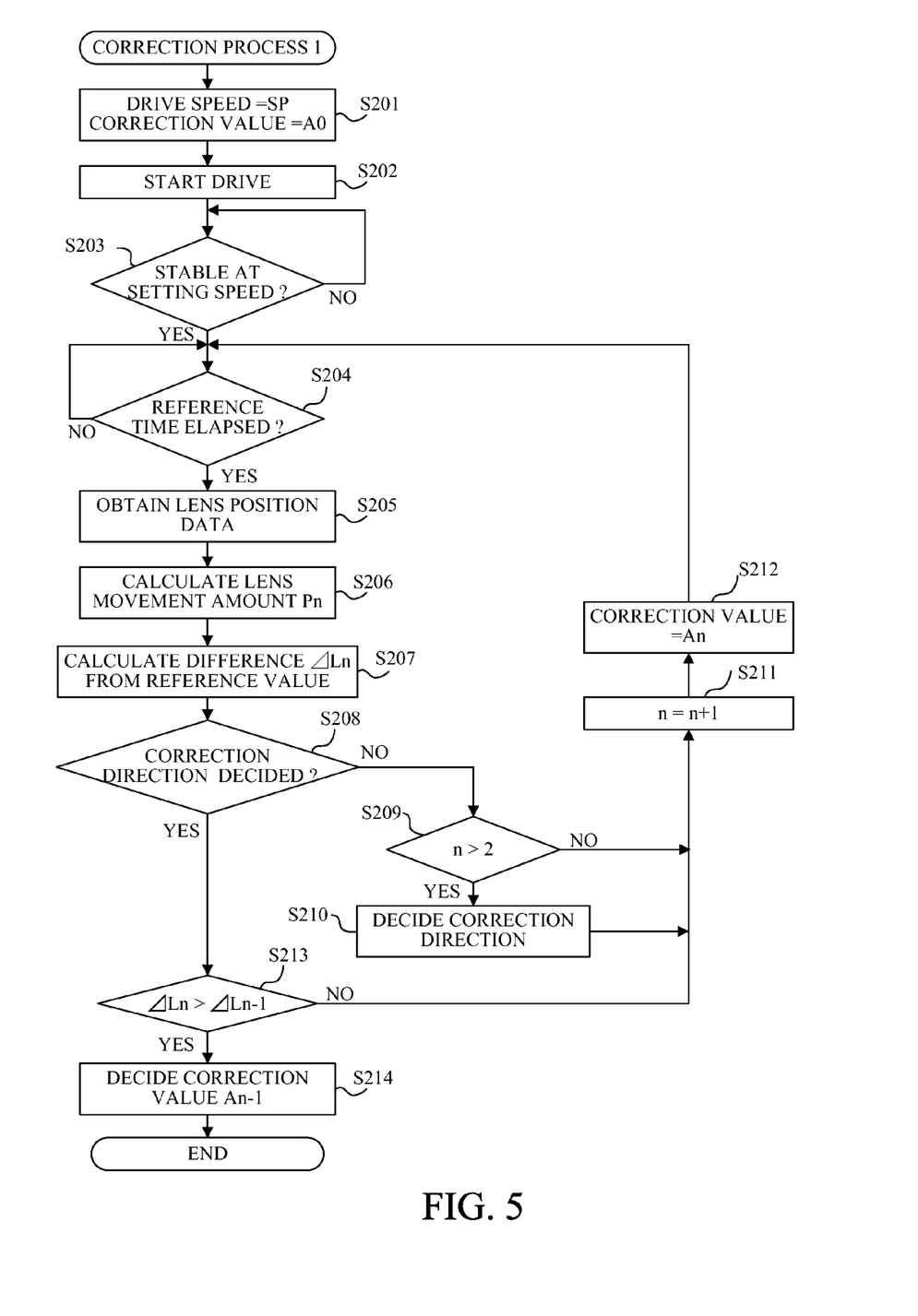
FIG. 5 is a flowchart showing operations in a correction process shown in FIG. 4.

FIGS. 4 and 5 show flowcharts of processing associated with the stepping motor 107 and performed by the microprocessor 111 in the image pickup apparatus shown in FIG. 1. The microprocessor 111 executes the processing according to a computer program. FIG. 6 shows, as described above, the position detection signals output from the lens position sensor 130.

The drive control signal provided to the stepping motor drive circuit 119 decides a phase difference between the excitation signals respectively provided to the A- and B-phases (plural phases) of the stepping motor 107. Therefore, correction of the drive control signal corresponds to correction of the phase difference between the excitation signals. An amplitude ratio of the excitation signals may be corrected by the correction of the drive control signal. This embodiment corrects the drive control signal provided to the stepping motor drive circuit 119 by using the position detection signal obtained from the lens position sensor 130. This realizes reduction of the vibration generated in the stepping motor 107 to reduce motor drive sound.

In response to power-on of the image pickup apparatus, the microprocessor 111 performs a predetermined initialization process. Then, the microprocessor 111 executes a system control 1 shown in FIG. 4 that is a start process routine (or a reset process routine) including a correction process 1 for acquiring a correction value of the drive control signal matched to (in other words, proper for) an individual characteristic of the stepping motor 107. The correction value of the drive control signal is hereinafter referred to as a "drive correction value".

In FIG. 4, at step S101, the microprocessor 111 determines a direction (lens drive direction) to move the variable magnification lens 102 toward its reference position by using a signal from the photo interrupter 109. Then, at step S102, the microprocessor 111 drives the stepping motor 107 so as to move the variable magnification lens 102 toward the reference position.

Next, at step S103, the microprocessor 111 determines whether or not the signal from the photo interrupter 109 has changed from a high level (High) to a low level (Low) in response to reaching of the variable magnification lens 102 to the reference position. In response to the change of the signal from the photo interrupter 109 from High to Low, the microprocessor 111 proceeds to next step S104 to perform a process to stop the drive of the stepping motor 107 (drive stop process) and a process to set an internal position counter. Thus, the microprocessor 111 completes a reference position setting process.

Next, at step S105, the microprocessor 111 performs the correction process 1 to acquire (calculate) the above-described drive correction value. The correction process 1 will be described in detail later with reference to FIG. 5. After completing the correction process 1, at step S106, the microprocessor 111 starts output of the captured image data to a rear face monitor (not shown) provided on the image pickup apparatus. Thus, the microprocessor 111 ends the system control 1 (reset process) performed as operations in response to the power-on. A process similar to such a reset process may be performed at any time other than at the time of the power-on.

Next, description will be made of the correction process 1 shown in FIG. 5. In the correction process 1, at step S201, the microprocessor 111 first sets a driving speed of the variable magnification lens 102 for acquiring the drive correction value to a predetermined driving speed SP, and sets the drive correction value to 0 that is an initial value.

The microprocessor 111 may decide a proper driving speed of the variable magnification lens 102 for acquiring the drive correction value while changing the driving speed thereof. However, in order to shorten a process time, it is desirable to obtain in advance a driving speed at which the vibration of the stepping motor 107 shown in FIG. 6 becomes a level that can be sufficiently detected by the lens position sensor 130. Particularly, it is desirable to obtain a driving speed as the predetermined driving speed SP at which an amount of the vibration of the stepping motor 107 is large and a change of the drive correction value causes a significant change of the vibration amount. In other words, it is desirable to set the predetermined driving speed SP when driving the stepping motor 107 for acquiring the drive correction value to a driving speed at which a larger difference between an actual movement amount and a reference movement amount of the stepping motor 107 than a predetermined value is generated by a change of the drive correction value. The actual movement amount and the reference movement amount of the stepping motor 107 will be described later.

Next, at step S202, the microprocessor 111 starts the drive of the stepping motor 107 so as to move the variable magnification lens 102 at the driving speed SP set at step S201.

It is necessary, for detecting the vibration amount of the stepping motor 107, to maintain the driving speed thereof at a constant speed. Therefore, at next step S203, the microprocessor 111 confirms whether or not a driving speed of the stepping motor 107 increased through an acceleration period after start of the drive thereof is stable at the predetermined driving speed SP that is the constant speed.

After confirming that the driving speed is stable, at step S204, the microprocessor 111 starts counting of a reference time (moving time period) T that is a predetermined time period, and then determines whether or not the reference time has been elapsed. Data of the reference movement amount obtained from this reference time T and an ideal moving speed of the variable magnification lens 102 is prestored in the internal memory 112. Moreover, at this step, the microprocessor 111 acquires, by using the position detection signal from the lens position sensor 130, position data of the variable magnification lens 102 at the time when the counting of the reference time T is started, and then stores it in the internal memory 112.

After the reference time T has elapsed, at step S205, the microprocessor 111 acquires, by using the position detection signal from the lens position sensor 130, position data of the variable magnification lens 102 at the time when the reference time T has just elapsed. Then, at step S206, the microprocessor 111 calculates the actual movement amount $P_n$ of the variable magnification lens 102 within the reference time T from the position data at the time when the counting of the reference time T has been started and the position data at the time when the reference time T has just elapsed.

Next, at step S207, the microprocessor 111 calculates a difference $\Delta L_n$ between the calculated actual movement amount $P_n$ and the reference movement amount stored in the internal memory 112. Then, the microprocessor 111 stores the calculated difference $\Delta L_n$ in the internal memory 112.

At subsequent step S208, the microprocessor 111 determines whether or not a direction (correction direction) to change the drive correction value has been decided. The correction direction is necessary in a process for deciding a proper drive correction value by gradually changing the drive correction value. The correction direction has not yet been decided at a time of start of the correction. Therefore, at step S209, the microprocessor 111 samples the difference $\Delta L_n$ plural times (for example, twice) to determine a direction in which the difference $\Delta L_n$ reduces with changes of the drive correction value, and then decides that direction as the correction direction at step S210.

If there is no vibration of the stepping motor 107 and thereby the driving speed of the variable magnification lens 102 is maintained at a constant speed, the difference $\Delta L_n$ does not change during the plural sampling times. However, in a case where the vibration of the stepping motor 107 occurs and thereby the driving speed of the variable magnification lens 102 is varied, the difference $\Delta L_n$ changes during the plural sampling times. The number of times for sampling the difference $\Delta L_n$ is not limited to twice, and may be a number of times more than twice.

When the correction direction has already been decided at step S208, the microprocessor 111 at step S213 compares the difference $\Delta L_n$ obtained at a current time with a difference $\Delta L_{n-1}$ obtained at a previous time. If the current difference $\Delta L_n$ is larger than the previous difference $\Delta L_{n-1}$, the microprocessor 111 proceeds to step S214 to acquire a drive correction value $A_{n-1}$ by which a minimum difference $\Delta L_n$ has been obtained among the stored data of the differences $\Delta L_n$ obtained in the past.

The microprocessor 111 decides this drive correction value $A_{n-1}$ as the proper drive correction value for the individual characteristic of the stepping motor 107, and then ends this correction process 1.

On the other hand, if the current difference $\Delta L_n$ is smaller than the previous difference $\Delta L_{n-1}$ at step S213, the microprocessor 111 proceeds to steps S211 and S212 to change the drive correction value in the decided correction direction. Then, the microprocessor 111 returns to the processes from step S204 to obtain the actual movement amount of the variable magnification lens 102 within the reference time T, to calculate the difference $\Delta L_n$ and then to compare the differences $\Delta L_n$ and $\Delta L_{n-1}$ at step S213 after step S208.

Figure 7:
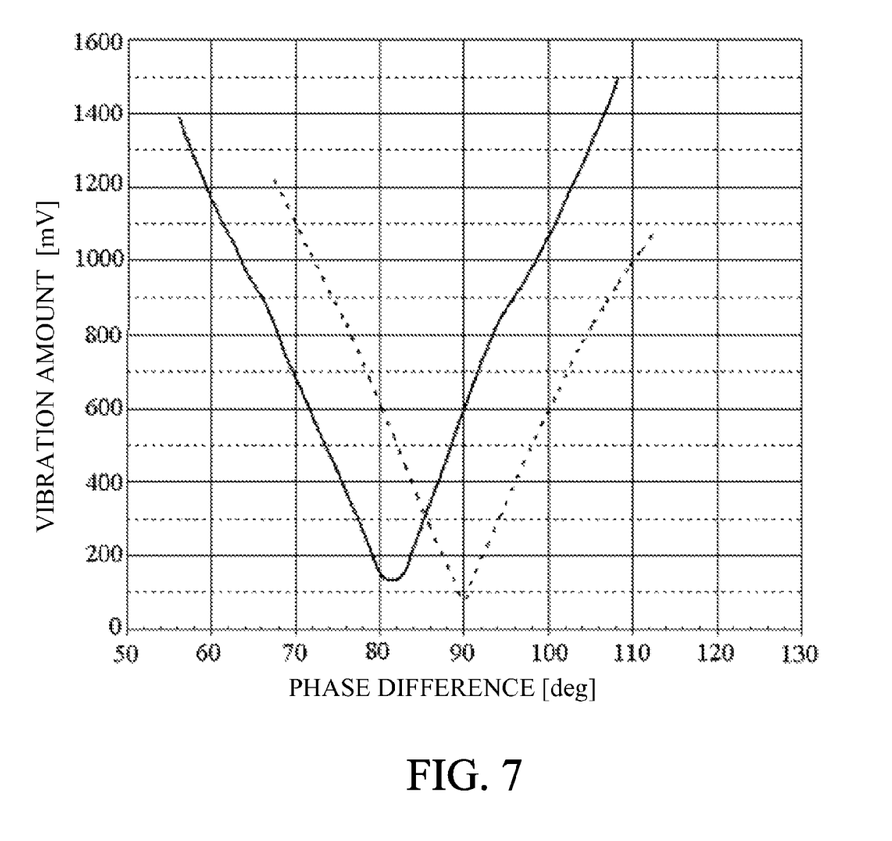
FIG. 7 shows correction values of phase differences of excitation signals in the image pickup apparatus of Embodiment 1.

FIG. 7 shows a relationship between (a) phase differences (degrees) of the excitation signals applied to the A- and B-phases of the stepping motor 107, the phase differences being measured with gradual changes of the drive correction value, and (b) the vibration amount (mV) of the stepping motor 107. A solid line and a broken line in the figure show measurement results of two samples of the stepping motor 107. As understood from the measurement results, gradually changing the drive correction value (that is, the phase difference between the excitation signals applied to the A- and B-phases) in a direction in which the vibration amount of the stepping motor reduces to search for a drive correction value minimizing the vibration amount enables acquisition of a proper drive correction value for that stepping motor.

The microprocessor 111 corrects the drive control signal by using the drive correction value thus decided such that the difference $\Delta L_n$ becomes as small as possible, in other words, controls the drive of the stepping motor 107 by using the drive correction value. Such drive control enables drive of the stepping motor 107 appropriate for the individual characteristic of the stepping motor 107, thereby making it possible to reduce the vibration of the stepping motor 107 and the motor drive sound generated therewith.

Figure 8:
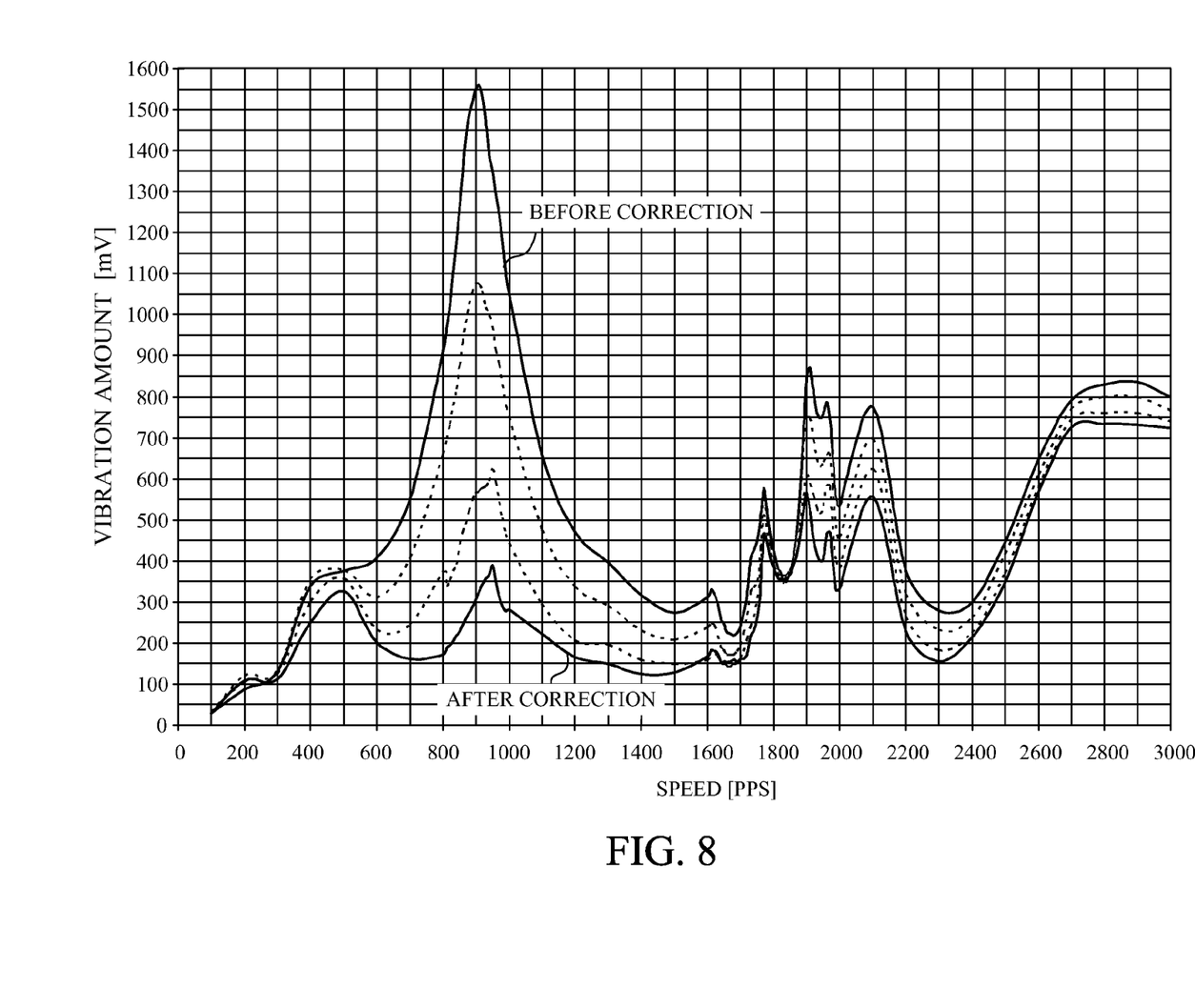
FIG. 8 shows a vibration reduction effect of the image pickup apparatus of Embodiment 1.

FIG. 8 shows a vibration reduction effect in the PM type two-phase stepping motor when the phase difference between excitation signals applied to the two phases of the stepping motor is corrected by the method described in this embodiment. FIG. 8 shows vibration amounts (mV) for drive frequencies (PPS) corresponding to the driving speeds of the stepping motor.

As understood from FIG. 8, the vibration reduction effect is obtained over the entire driving speed range. In particular, around a driving speed of 900 PPS where the vibration amount before the correction has a peak value, the vibration amount after the correction is reduced to about ¼ of the peak value.

Embodiment 2

Next, description will be made of a correction process (correction process 2) to correct a drive control signal provided to a stepping motor used in an image pickup apparatus that is a second embodiment (Embodiment 2) of the present invention with reference to FIG. 9. A configuration of the image pickup apparatus of this embodiment is same as that of Embodiment 1 shown in FIG. 1, so that components in this embodiment identical to those in Embodiment 2 are denoted by the same reference numerals as those in Embodiment 1.

The correction process 2 in this embodiment corrects plural correction items relating to the drive control signal for the stepping motor, thereby further reducing the vibration amount of the stepping motor.

Figure 9:
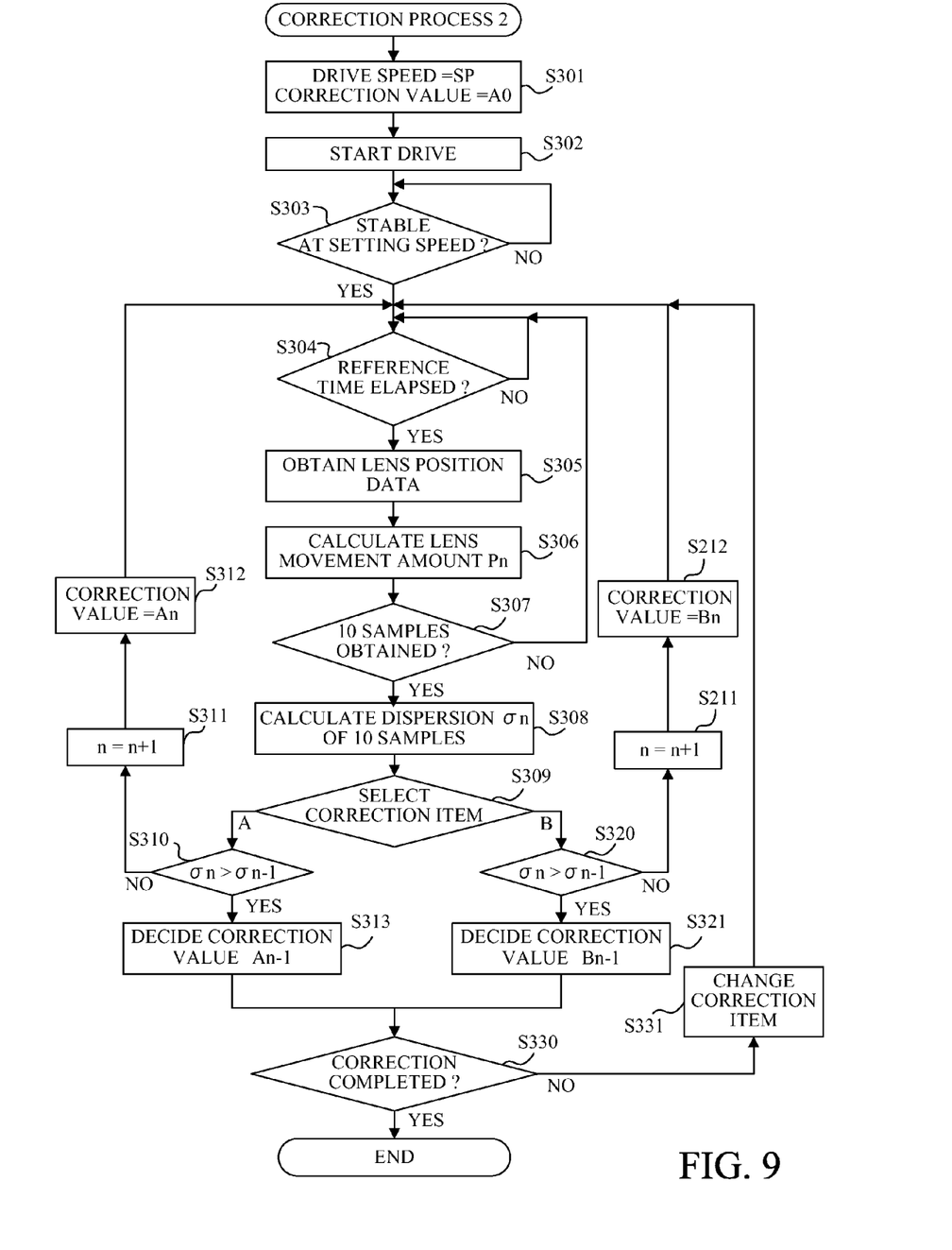
FIG. 9 is a flowchart showing operations of an image pickup apparatus that is Embodiment 2 of the present invention.

In a flowchart shown in FIG. 9, processes from step S301 to step S306 are same as those from step S201 to step S206 in Embodiment 1 shown in FIG. 4.

The microprocessor 111 at steps S302 and S303 drives the stepping motor 107 at a predetermined driving speed SP. In this embodiment, it is desirable to set the driving speed SP of the stepping motor 107 when driving the stepping motor 107 for acquiring a drive correction value, to a driving speed at which a larger variation amount of actual movement amounts (described later) than a predetermined value is generated by a change of the drive correction value.

Then, at steps S304 to S306, the microprocessor 111 calculates the actual movement amount $P_n$ of the variable magnification lens 102 within the reference time T from the position data at the time when the counting of the reference time T has been started and the position data at the time when the reference time T has just elapsed.

Next, at step S307, the microprocessor 111 determines whether or not data acquisition of the actual movement amount $P_n$ of the stepping motor 107 has been repeated plural N times (ten times in this embodiment). If the data acquisition has not yet been repeated N times, the microprocessor 111 returns to step S304. If the data acquisition has been repeated N times, the microprocessor 111 proceeds to step S308 to calculate a dispersion $\sigma_n$ of the N actual movement amounts $P_n$ by using the following expression:

$$\sigma_n = \sqrt{\{1/N \cdot \Sigma(P_n - P_{ave})^2\}}$$

where $P_{ave}$ represents an average value of the N actual movement amounts $P_n$.

The dispersion (standard deviation) $\sigma_n$ shows a magnitude of the variation amount of the actual movement amounts $P_n$ acquired plural times. A smaller dispersion $\sigma_n$ means a smaller variation amount of the actual movement amounts $P_n$.

Next, at step S309, the microprocessor 111 selects a correction target item on which the microprocessor 111 actually performs the correction from plural correction items. The flowchart shows a case of selecting the correction target item from correction items A and B. For example, the phase difference between the excitation signals applied to the A- and B-phases of the stepping motor 107, which was described in Embodiment 1, can be set as the correction item A, and an amplitude ratio of the excitation signals can be set as the correction item B. Moreover, the microprocessor 111 may correct, as another correction item, waveforms of the excitation signals applied to the A- and B-phases of the stepping motor 107 into trigonometric waveforms such as sine waveforms whose 180-degree phases with respect to a 0-degree phase are mutually shifted.

When selecting the correction item A as the correction target item, the microprocessor 111 proceeds to step S310 to compare the dispersion value $\sigma_n$ calculated at a current time with a dispersion value $\sigma_{n-1}$ calculated at a previous time.

If $\sigma_n$ is smaller than $\sigma_{n-1}$ the microprocessor 111 proceeds to steps S311 and S312 to repeat evaluation of a next drive correction value of the correction item A. Although not shown, in this description, the correction direction described in Embodiment 1 has been decided. On the other hand, if $\sigma_n$ is larger than $\sigma_{n-1}$, the microprocessor 111 regards the drive correction value as exceeding a proper drive correction value to proceed to step S313. At step S313, the microprocessor 111 decides the drive correction value calculated at the previous time as a proper drive correction value $A_{n-1}$ for the stepping motor 107, and then completes the correction of the correction item A.

At next step S330, the microprocessor 111 determines whether or not the correction of the whole of the plural correction items has completed. If the correction has not yet completed, the microprocessor 111 proceeds to step S331 to switch the correction target item to an uncorrected correction item (that is, the correction item B). Then, the microprocessor 111 returns to the processes from step S304 to decide a proper drive correction value $B_{n-1}$ in the correction item B, and thereafter completes the correction of the correction item B.

Thus, the microprocessor 111 corrects the drive control signal by using the drive correction value in each correction item decided such that the variation amount of the actual movement amounts $P_n$ becomes as small as possible. In other words, the microprocessor 111 controls the drive of the stepping motor 107 by using the drive correction value. Such drive control enables drive of the stepping motor 107 appropriate for the individual characteristic of the stepping motor 107, thereby making it possible to more effectively reduce the vibration of the stepping motor 107 and the motor drive sound generated therewith.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-086810, filed on Apr. 5, 2010, which is hereby incorporated by reference herein in its entirety.

What is claimed is:

1. An optical apparatus comprising:
   a motor to move an optical element;
   a position detector configured to detect a position of the optical element;
   a controller configured to control drive of the motor using a position detection signal from the position detector; and
   a memory configured to store a reference movement amount of the optical element corresponding to a moving speed and a moving time period of the optical element moved by the motor,
   wherein the controller is configured to acquire a correction value for reducing a difference between (a) an actual movement amount of the optical element obtained using the position detection signal when the optical element is moved by the motor and (b) the reference movement amount, and then to control the drive of the motor using the correction value.

2. An optical apparatus according to claim 1, wherein the controller is configured to set, when driving the motor for acquiring the correction value, a driving speed of the motor to a speed at which a larger difference between the actual movement amount and the reference movement amount than a predetermined value is generated by a change of the correction value.

3. An optical apparatus according to claim 1, wherein:
   the motor is a stepping motor, and
   the controller is configured to correct, using the correction value, a phase difference or a amplitude ratio between excitation signals applied to plural phases of the stepping motor.

4. An optical apparatus according to claim 1, wherein:
   the motor is a stepping motor, and
   the controller is configured to correct, using the correction value, excitation signals applied to plural phases of the stepping motor into trigonometric waveform signals whose 180-degree phases with respect to a 0-degree phase are mutually shifted.

5. An optical apparatus according to claim 1, wherein the controller is configured to:
   perform a reset process including a process to move the optical element to a reference position base on which the position detector detects the position of the optical element, and
   drive the motor for acquiring the correction value in the reset process.

6. An optical apparatus comprising:
   a motor to move an optical element;
   a position detector configured to detect a position of the optical element; and
   a controller configured to control drive of the motor using a position detection signal from the position detector,
   wherein the controller is configured to (a) detect plural times, using the position detection signal, a movement amount by which the optical element moves within a predetermined time while controlling the motor to move the optical element at a constant speed, (b) acquire a correction value for reducing variation among the plurality of detected movement amounts, and (c) control the drive of the motor using the correction value.

7. An optical apparatus according to claim 6, wherein the controller is configured to set, when driving the motor for acquiring the correction value, a driving speed of the motor to a speed at which a larger variation amount of the detected movement amounts than a predetermined value is generated by a change of the correction value.

8. An optical apparatus according to claim 6, wherein:
   the motor is a stepping motor, and
   the controller is configured to correct, using the correction value, a phase difference or a amplitude ratio between excitation signals applied to plural phases of the stepping motor.

9. An optical apparatus according to claim 6, wherein:
   the motor is a stepping motor, and
   the controller is configured to correct, using the correction value, excitation signals applied to plural phases of the stepping motor into trigonometric waveform signals whose 180-degree phases with respect to a 0-degree phase are mutually shifted.

10. An optical apparatus according to claim 6, wherein the controller is configured to:
    perform a reset process including a process to move the optical element to a reference position base on which the position detector detects the position of the optical element; and
    drive the motor for acquiring the correction value in the reset process.

11. An optical apparatus comprising:
    a motor to move an optical element;
    a position detector configured to detect a position of the optical element;
    a controller configured to control drive of the motor using a position detection signal from the position detector; and
    a memory configured to store a reference movement amount of the optical element corresponding to a moving speed and a moving time period of the optical element moved by the motor,
    wherein the controller is configured to control the drive of the motor to reduce a difference between (a) an actual movement amount of the optical element obtained using the position detection signal when the optical element is moved by the motor and (b) the reference movement amount.

* * * * *